May 5, 1970 R. A. HESS ET AL 3,510,354
FUEL CELL
Filed July 3, 1961 3 Sheets-Sheet 1
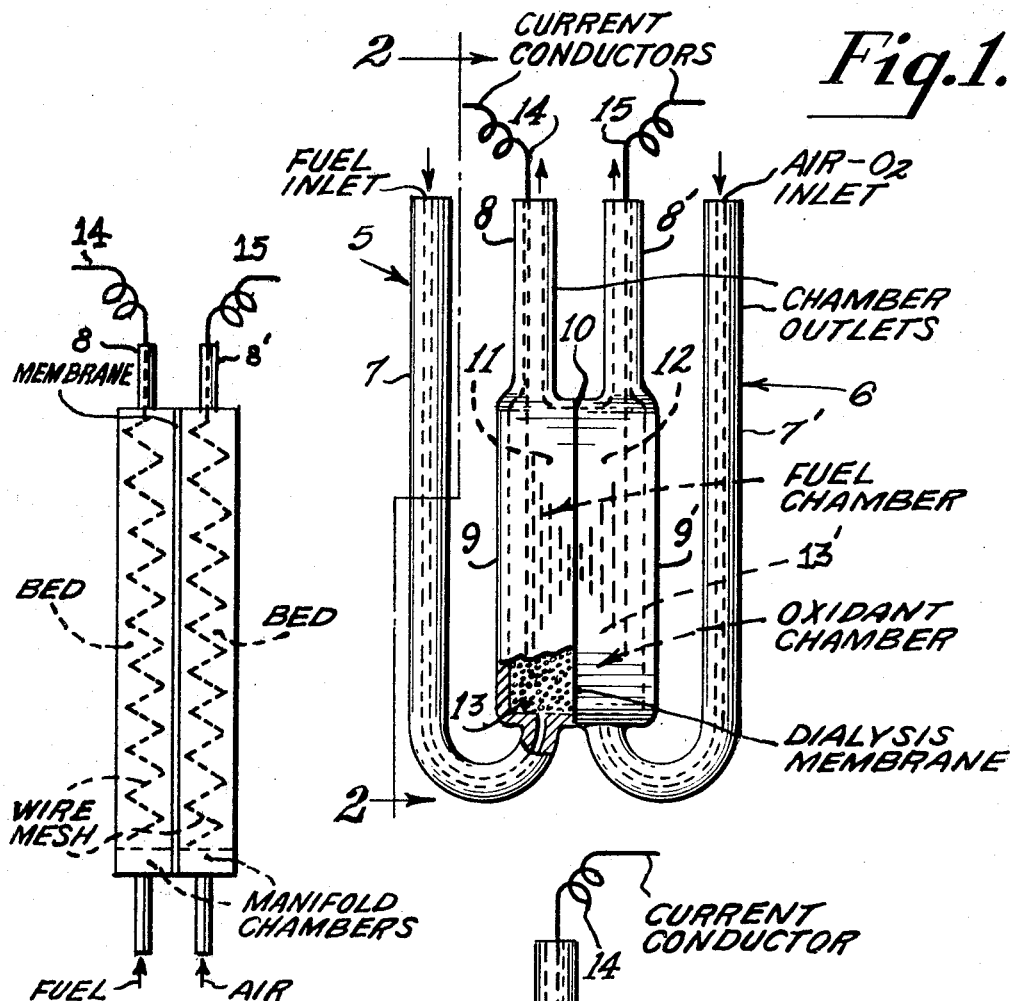
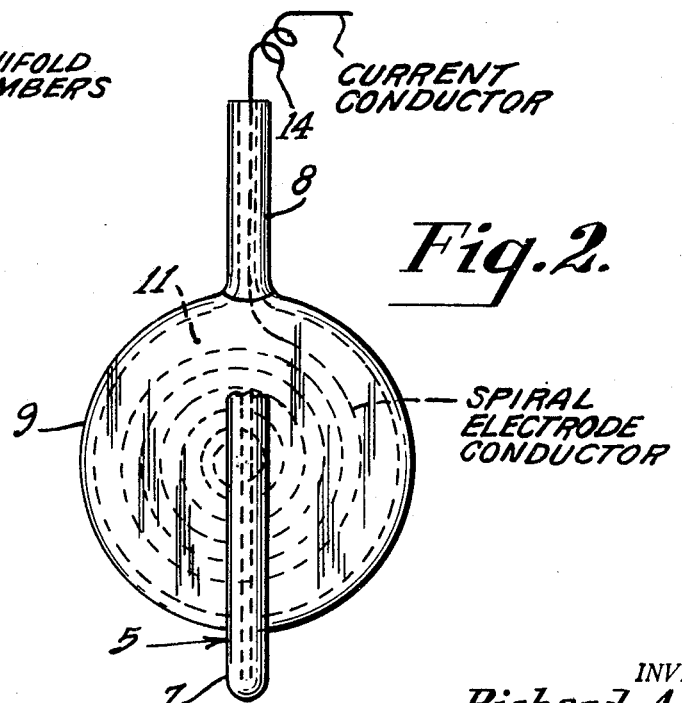
INVENTORS.
Richard A. Hess &
James E. McEvoy
BY William Klabunde
ATTORNEY.

May 5, 1970  R. A. HESS ETAL  3,510,354
FUEL CELL
Filed July 3, 1961  3 Sheets-Sheet 2
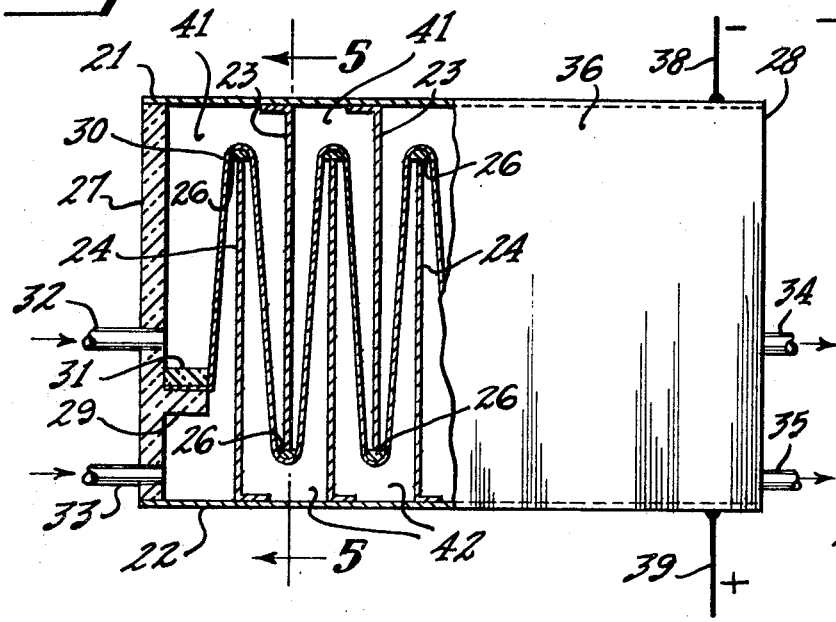
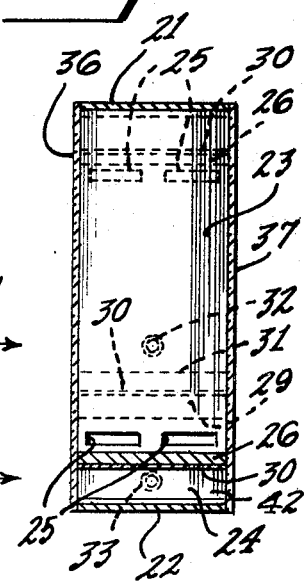
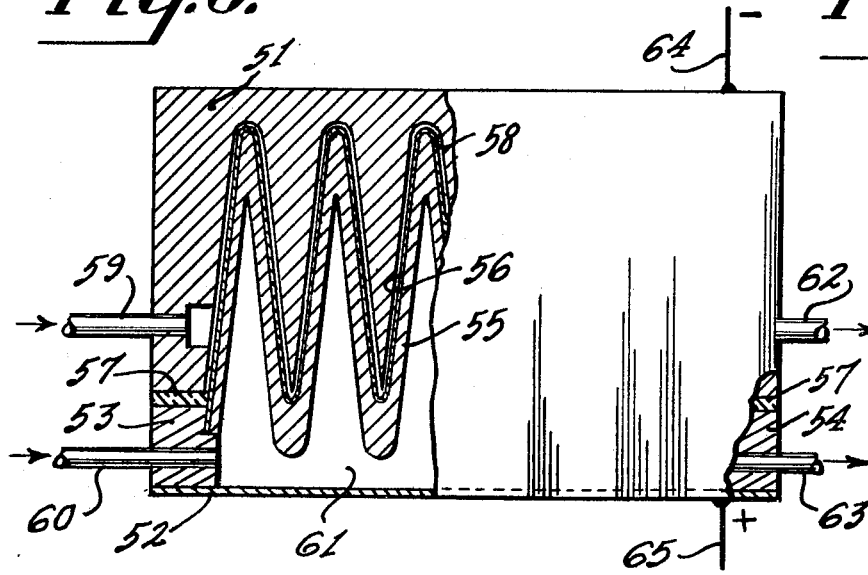
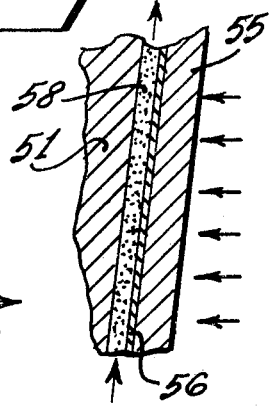
INVENTORS.
Richard A. Hess &
James E. McEvoy
BY William K...
ATTORNEY.

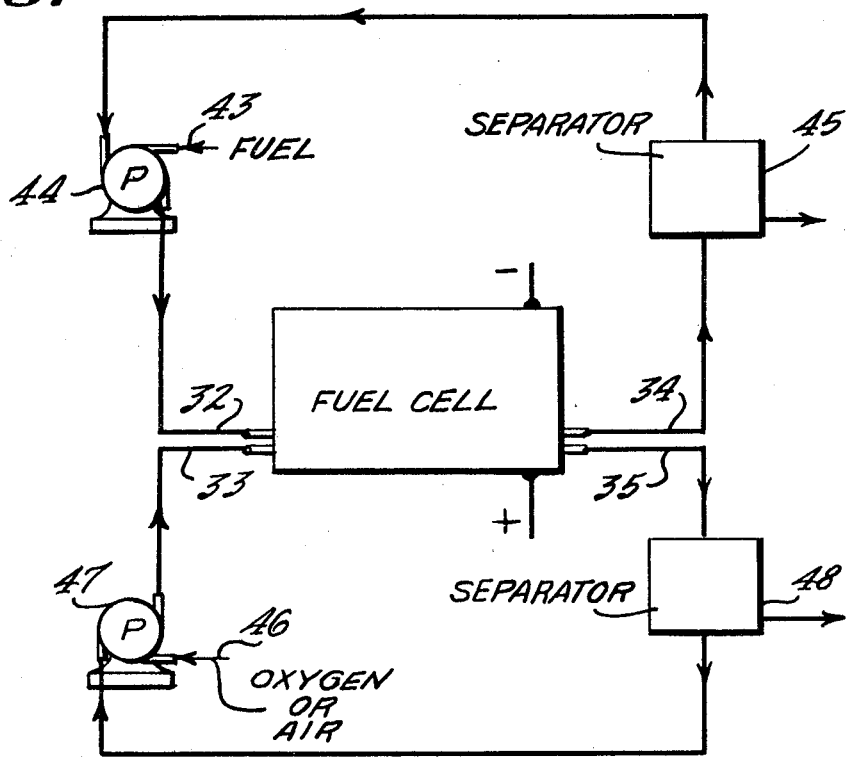
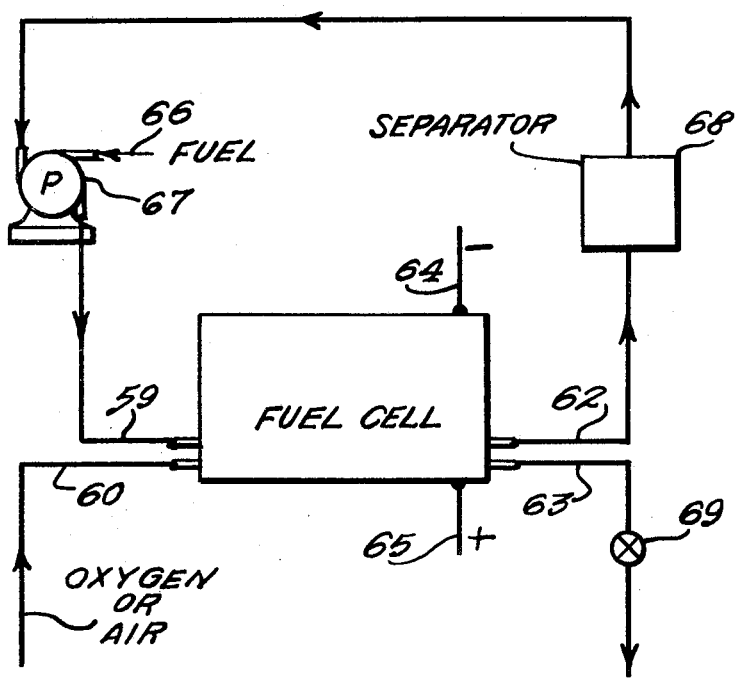

United States Patent Office 3,510,354
Patented May 5, 1970

---

3,510,354
FUEL CELL
Richard A. Hess, Claymont, Del., and James E. McEvoy, Morton, Pa., assignors, by mesne assignments, to Northern Natural Gas Company, Omaha, Nebr., a corporation of Delaware
Filed July 3, 1961, Ser. No. 121,506
Int. Cl. H01m 27/00
U.S. Cl. 136—86                                6 Claims This invention relates to improvements in a fuel cell for the electrochemical oxidation of gaseous or liquid fuels, such as hydrogen, hydrocarbons, alcohols, carbonyl compounds and the like, to generate electrical current. The invention is particularly directed to fuel cells operating at relatively low temperatures, such as well below 500° F., and preferably not exceeding 200° F., and with either an acid or an alkaline electrolyte.

A known type of low-temperature fuel cell for utilization of gaseous or liquid fuels comprises a pair of rigid porous electrodes in the form of relatively thin flat plates or discs. The porous plates are the fuel and oxygen electrodes, and they are narrowly separated by an electrolytic material which provides an electrochemical connection for ionic conduction or transport between the electrodes while insulating the electrodes against electronic conduction which would short circuit the cell. Outer casing means are provided at the exposed faces of the flat electrode plates to form separate chambers from which the gaseous or liquid fuel and oxygen-containing gas are fed directly into the porous fuel and oxygen electrodes, respectively.

The rigid electrodes comprise porous supports which are rendered catalytically active by known techniques involving the impregnation or deposition of certain catalytic materials, such as palladium, platinum, silver, etc., within or upon the surface thereof.

In the operation of such cells, there is continuous flow of gaseous or liquid materials from the fuel or oxygen containing chambers into the pores of the relatively-thin porous electrodes, and the current-generating reaction takes place in the area where the fuel, the catalyst and the electrolyte are in cooperative arrangement. The actual current-generating region is quite possibly a narrow planar zone which may be at the face of the electrode plate adjacent to the electrolyte.

There are certain disadvantages inherent in such type of cell. For example, by reason of the fact that the chemical reactions occur almost entirely at the interface between the liquid or gaseous fuel and the electrolyte, only a relatively small portion of the total volume of the electrode chamber is utilized to provide active sites for the generation of electrical current. Furthermore, with gaseous fuel it is necessary to maintain several pounds per square inch of pressure differential between the gas chambers and the aqueous electrolyte so that electrodes do not become flooded. For example, about 4 p.s.i.g. may be required in the gas chambers to maintain a suitable bubble pattern at the liquid-gas interface on the electrolyte side of the electrode. Inasmuch as the plate electrode is preferably thin, such as about ⅛ to ¼ inch in thickness, the necessity for such back pressure creates fabricating problems if the electrode plate or disc is of any substantial area across the face.

In accordance with the present invention, these and other disadvantages are in large part obviated by providing a particulate or granular mass of catalytically active material instead of a rigid plate or disc to form either or both of the fuel cell electrodes. The mass of particulate or granular solids constituting an active electrode of the cell is confined in whole or in part within a chamber which is separated from the other electrode or from a chamber containing the same by a semipermeable membrane, such as a dialysis membrane, which will permit ionic transfer between the fuel and oxygen electrodes while at the same time serving as a barrier to electronic conduction, thereby preventing short circuiting of the cell.

A suitable electrolyte, which may be either alkaline or acid, is provided either as an aqueous solution within the electrode chambers or as a component of the membrane, or both. In any case, the electrolytic material is available to substantially all portions of the particulate electrode material. In an alkaline cell the aqueous electrolyte may comprise either a suitable hydroxide, such as potassium hydroxide, or an alkali metal carbonate or bicarbonate. In an acid cell the electrolyte may comprise a strong mineral acid, such as sulfuric acid, hydrochloric acid, etc. In either case, during the operation of the cell there will be a migration of ions through the semi-permeable membrane from one electrode body or mass to the other. When the electrolyte is basic, hydroxyl or carbonate ions are formed at the oxygen electrode, and when the electrolyte is acid, hydrogen ions are formed at the fuel electrode.

The mass of particulate catalytic material forming an electrode may be fixed or moving. For example, it may be in the form of a fixed compact bed of granular solids wholly contained within its respective anode or cathode chamber, or in the form of a moving body comprising a catalytically active metal, such as palladium, platinum, nickel, silver, etc., dispersed on a suitable support, such as activated carbon, suspended in a circulating electrolyte.

When both electrodes are fluid, the electrode masses may be pumped concurrently or countercurrently through the fuel cell chambers. An individual external system includes pumping means within which the fuel and the oxygen-containing agents may be blended with their respective electrodes at high pressure, and by means of which the blended materials may be transported into and through the cell chambers at a lower pressure sufficient only to maintain a constant flow. The external system includes also suitable means for replenishing any depleted fuel and oxygen-containing agents as well as for removing unwanted reaction products.

For each fuel cell chamber the invention contemplates the provision of extensive electric current collecting and conducting means chemically resistant to the electrolyte, whether the particulate electrodes be of fixed granular bed or circulating fluid type. In the former case it is desirable that the current conducting elements be distributed to the maximum degree throughout the mass of solids so that electrical charges at the catalytic sites throughout the mass may readily be transferred from the catalytic electrode to the conductor. In the case of a fluid electrode there is constant turbulent motion of the electrode within the cell chamber, in which the electric current collecting and conducting means are distributed in such a manner as to give maximum contact for collection of electrons with minimum obstruction to flow of the fluid electrode. Fresh reactants, such as fuel or oxygen, are constantly being supplied to the active centers of the catalytic materials.

For a fuller understanding of the invention reference may be had to the following description and claims taken in connection with the accompanying drawing diagrammatically illustrating several arrangements of apparatus according to the invention, together with flow diagrams for fluid electrode systems, in which:

FIG. 1 is an elevational view of a fixed particulate electrode fuel cell, shown in partial section;

FIG. 2 is a side view of the cell in partial section taken along the line 2—2 of FIG. 1;

FIG. 3 is a fragmentary diagrammatic view, in partial section, showing another form of electrode chamber and current conductor;

FIG. 4 is an elevation of a fuel cell, in partial section, employing fluid electrodes for both the fuel side and the oxygen side of the cell;

FIG. 5 is a sectional side view taken along the line 5—5 of FIG. 4;

FIG. 6 is an elevation of a fuel cell, in partial section, employing a fluid electrode on the fuel side of the cell and a rigid porous electrode on the oxygen side;

FIG. 7 is an enlarged fragmentary section of the fuel cell of FIG. 6 showing the positional relationship of the conductive electrode spacer, the fluid fuel electrode, the semipermeable membrane electrolyte and the rigid porous oxygen electrode;

FIG. 8 is a circuit for the cell of FIG. 4; and

FIG. 9 is a circuit diagram for the cell of FIG. 6.

Referring to the embodiment of the invention shown in FIGS. 1 and 2 of the drawing, the fuel cell comprises a pair of identical U-tube members indicated in general by the numerals 5 and 6, the corresponding parts of which are designated by numerals and their primes, respectively. Thus, U-tube member 5 comprises a continuous straight leg 7 of uniform cross-sectional flow area and a discontinuous leg 8 having a shallow cylindrical housing portion 9 arranged on a horizontal axis at an intermediae location along the length of the leg 8. One end of the cylindrical housing is open, and forms a shallow recess in open communication at diametrically opposite upper and lower sides with the upper and lower portions of the tube leg 8.

The pair of U-tube members are joined in juxtaposition and separated by a semi-permeable membrane 10 between the open ends of their cylindrical housing portions 9, 9'. The semi-permeable membrane 10 thus provides a physical partition to divide the enlarged cylindrical enclosed space which is formed by the union of the two housing portions into separate confined chambers 11 and 12 for carrying out the oxidation and reduction reactions, respectively. Thus, chamber 11 is the fuel chamber or oxidation zone and chamber 12 is the oxidant chamber or reduction zone of the fuel cell.

Chambers 11 and 12 contain masses or beds 13, 13' of granular catalytic material which individually form the electrode for the respective chamber. The bed 13 in chamber 11 is therefore the fuel electrode and the bed 13' in chamber 12 is the oxygen electrode. While beds 13, 13' of granular catalyst are employed in both chambers, it is to be understood that either one of the chambers may contain a single rigid electrode member such as a thin flat porous disc of catalytic material.

The granular catalyst in either chamber may comprise one or more of the noble metals, such as palladium, platinum, silver, nickel, etc., supported on granules of electro-conductive material, such as high surace area active carbons, graphites, metals, or metallic oxides derived from silver, nickel, sintered iron, etc. It is contemplated also that granular beds of unsupported metals, such as platinum, palladium, Raney nickel, etc., may be used. In any case, the granular material should be selected with care in respect to matters of surface area, pore size distribution, particle size, etc., as well as catalytic activity for promoting the particular reaction. The electrodes are preferably activated in the dry state, that is, the metal oxide is reduced to the metal, as by contact with hydrogen, before the liquid electrolyte is added.

The electrolyte for an alkaline cell may comprise an aqueous solution of hydroxides, alkali metal carbonates or bicarbonates, etc. For an acid cell it may comprise a strong mineral acid. The electrolyte may be introduced into the electrode chambers 13, 13' through the upper portions of legs 8 and 8' after the catalytic electrode material has been placed therein, the liquid electrolyte being introduced only in such amount as to provide maximum ionic conduction without excessive wetting of the electrode material. Alternatively, the electrode material may be presaturated with liquid electrolyte prior to its introduction into the electrode chambers. Where the chemical reaction produces a certain slight amount of water, the presaturation treatment may be just short of the optimum, so that the produced water may supply the additional requirements as well as replace water vapor carried out of the chamber through the vent. Additional liquid electrolyte may be supplied, if needed, through the upper ends of legs 8, 8'.

With the catalytic electrode in the form of a fixed compact mass or bed of granular material, the sites for generating electrical energy are distributed substantially throughout the entire granular mass, rather than along a generally planar interface, as in the case of the aforementioned known type of cell. In order to effect the most efficient electronic transfer at the distributed catalytic sites and the maximum collection of electrical energy and flow of electrical current through the external circuit, an electrical conductor, such as a wire grid or mesh of nickel, steel, platinum, etc., is distributed as uniformly as may be practicable throughout the granular mass.

The embodiment of the invention represented by FIGS. 1 and 2 shows one form of electrical conductor represented by wires 14 and 15 coiled spirally within the compact masses of granular material 13, 13' in chambers 11 and 12, respectively, and extended upwardly out of the cell through the upper portions of tubes 8 and 8'.

The gaseous fuel is introduced at the upper end of the outside leg 7 of U-tube 5 and passes down leg 7 and up leg 8 into chamber 11 containing the fuel electrode 13. The gaseous reaction products are vented through the upper portion of leg 8, the internal diameter of which is large enough to loosely accommodate the wire 14.

Oxygen-containing gas, such as air or oxygen, is introduced at the upper end of the outside leg 7' of U-tube 6 and passes down leg 7' and up leg 8' into oxidant chamber 12 containing the oxygen electrode 13'. The gaseous reaction products, if any, are vented through the upper portion of the leg 8' which loosely contains the wire 15.

The current conductor may be in any of several desirable forms, dependent upon the type and construction of the cell. With the electrode in the form of a fluid the conductor may form one of the bounding surfaces of the fuel or oxidant chamber, other than the surface of the semi-permeable membrane; or the conductor may be integrally bonded to the surface of the membrane, as by plating; or may be an appropriate combination.

Referring to the embodiment of the invention illustrated in FIGS. 4 and 5, the fuel cell is in the form of an elongated rectangular housing comprising top and bottom conductive metal wall members 21 and 22, respectively. Walls 21 and 22 have spaced, parallel, perpendicular partitions 23 and 24, respectively, which extend the full internal width of the housing but not the full internal height. The partition members 23 and 24 also are of conductive metal and they are joined at one end in good electrical contact with their respective conductive wall members 21 and 22. A narrow foot portion may be provided at one end of each partition to facilitate its attachment to the metal walls, as by soldering, brazing, etc. The free end of each partition is provided with narrow slots 25 set back from the edge, and the edges are provided with rounding-over strips 26.

The wall members 21 and 22 may be of identical form, with the spacing of the partitions such that, when a pair of walls are reversed end-to-end and interengaged, the partitions will be staggered and will form a zigzag passageway from one end of the housing to the other.

The end walls 27 and 28 likewise may be identical, and they are formed of non-conductive material. A horizontal ledge 29 is formed along the entire lower inner face of end walls 27 and 28. A thin, flexible, semi-permeable membrane 30 is attached at its ends to the upper surface of the ledges 29 by hold-down strips 31. The membrane 30 is passed up and down in zigzag fashion over and under the free ends of the partitions 23 and 24. The strips 26 serve to provide a rounded turn for the membrane 30 over the ends of the partitions 23 and 24 and to hold the membrane away from each partition adjacent to the slotted regions, so that fluid may readily flow through the slots.

A fluid fuel electrode inlet 32 and a fluid oxidant electrode inlet 33 are provided in end wall 27 above and below its ledge portion 29, respectively, and corresponding fluid electrode outlets 34 and 35 are provided at the other end of the housing. Front and back non-conductive wall members 36 and 37, respectively, complete the housing enclosure. The front and back walls are joined in fluid-tight connection to the edges of the partitions 23 and 24 and to the edges of the semi-permeable membrane 30.

Electrical conductors or leads, such as wires 38 and 39, are connected to the top and bottom walls 21 and 22, respectively, to provide current for an external electrical circuit, not shown.

The total space 41 within the housing and above the membrane 30 forms the fuel chamber of the cell, and the total space 42 below the membrane forms the oxidant chamber.

FIG. 8 shows a circuit including the fuel cell of FIG. 4. The liquid or gaseous fuel is supplied from line 43 to a mixing or blending pump 44 which is in a closed circuit including the fuel chamber 41 of the cell and a separator or disengager 45 within which unwanted oxidation products are removed from the circulating sol or slurry forming the fuel electrode. Oxygen or air is supplied from line 46 to a similar pump 47 which is in a closed circuit including the oxidant chamber 42 of the cell and a separator or disengager 48 within which unwanted nitrogen or water or both are removed from the circulating sol or slurry forming the oxygen electrode.

FIGS. 6 and 7 show another embodiment of the invention wherein a fluid electrode is provided for the fuel side of the cell while a rigid porous electrode is provided for the oxidant side.

The cell is in the form of a split, rectangfiular or box-like housing comprising a solid fuel electrode spacer 51 in the form of a casting of conductive metal or of non-conductive material, such as a plastic faced along the entire toothed surface with a conductive metal surface. The lower half of the split cell comprises a base plate 52 and short upright end members 53 and 54 which are rabbetted along their upper inside edges. A cast zigzag oxygen electrode 55 of catalytically active porous material is set above the base plate 52 with its ends disposed upon the rabbetted portions of members 53 and 54. The upper surface of the zigzag oxygen electrode 55 is covered or coated with a semi-permeable membrane 56, shown in FIG. 7.

The lower ends of casting 51 are supported by and electrically insulated from the upper ends of members 53. A strip of non-conductive material 57 separates the member 51 from members 53 and 54. The zigzag oxygen electrode 55 is spaced from the underside of toothed casting 51 so as to provide an elongated, narrow, zigzag passageway 58 through the cell. The narrow passageway 58 forms the fuel chamber of the cell. An inlet 59 provides access for fuel and a fluid electrode to the fuel chamber 58, and an inlet 60 provides access for oxygen-containing gas to the oxidant chamber 61 which is the total space below the zigzag oxygen electrode 55. Outlets 62 and 63 are provided at the opposite end of the cell to discharge reaction products and the fluid electrode from fuel chamber 58, and to discharge gaseous reaction products from the oxidant chamber 61. Electrical conductors 64 and 65 are provided for current withdrawal from the cell. The conductor 64 may be connected to the casting 51, provided the entire casting is conductive, or to the conductive surface on the underside of the toothed casting 51, where such conductive surface is provided as an alternative. Conduit members 59, 60, 62 and 63 are insulated from the electro-conductive portions of the fuel cell housing. Where the conduits enter the housing through non-conductive end walls, as in FIG. 4, the conduits require no insulation. Where the conduits enter through end wall portions which are electro-conductive, insulating sleeves, not shown, may be provided, or the conduits may be of non-conductive material for at least the initial short portion of their length where they extend through the housing wall.

FIG. 9 shows a circuit including the cell of FIGS. 6 and 7. The fuel is introduced to the closed circuit containing a fluid electrode through line 66. The fuel and the fluid electrode sol or slurry are mixed or blended in pump 67 and passed to the fuel cell through line 59. A disengager or separator 68 is provided in the circuit to take the discharge from the fuel chamber 58 through conduit 62 and to remove unwanted oxidation products. Oxygen or air enters the oxidant chamber 61 through inlet 60 and the gaseous reaction products, if any, are discharged through outlet 63. If air is used, a depressuring device, as at 69, may be provided.

Although the illustrated embodiment of FIGS. 1 and 2 discloses shallow, circular electrode chambers, with gas inlet and outlet means at diametrically opposite sides, space or spacing considerations in the case of a multi-cell unit may make it desirable or necessary that the chambers be rectilinear in form to achieve optimum compactness. Furthermore, in order to assure uniform distribution of gas flow through the bed of granular material it is contemplated that manifolding may be provided at the bottom or inlet ends of the electrode chambers, as illustrated diagrammatically in FIG. 3.

As an alternative to rectilinear construction of the fixed-bed type of cell the fuel cell chambers may comprise a cylinder within a cylinder or a circular core within a cylinder. For example, where both electrodes comprise a mass of granular solids the one may be a central circular core of solids and the other may be a cylindrical bed surrounding the central electrode, with a cylindrical semi-permeable membrane separating the beds. On the other hand, the central electrode might well be a rigid hollow cylindrical electrode encased in a semi-permeable membrane, the whole being set in a bed of granular material comprising the outer electrode.

In the embodiments of the invention illustrated in FIGS. 4 to 9 there is a constant circulation of particulate electrode material through at least one reaction chamber (fuel or oxidant) of the fuel cell. The fluid electrode is caused to flow through its respective cell chamber and through the external piping circuit associated therewith by means of a blending-type pump which serves to blend the gaseous or liquid fuel or the oxygen-containing gas, as the case may be, with its respective particulate electrode at high pressure. The high pressure conditions occur only within the pump cylinder or housing, the cell chamber receiving only that pressure necessary to maintain a continuous flow of the fluid electrode along its path of flow.

Since only small-capacity pumps are required, their operation requires little drain on the total energy generated by the fuel cell. The pumps, for example, may be driven by small electric motors or they may be operated with a power take-off from the machine, vehicle or other moving apparatus which is operated by means of the electrical energy developed by the fuel cell.

The separating or disengaging apparatus by which the removal of the unwanted reaction products from the fluid electrode mass is effected is shown only diagrammatically in the drawings for the reason that, of itself, it forms no part of the invention. Any conventional apparatus suitable for carrying out the intended function may be employed. The separator, however, should be inserted in the circuit between the discharge side of the fuel cell and the pump inlet.

In a multiple-cell battery a separate pump should be provided for each fluid electrode of each cell, preferably operating as a group or groups from a common source of motive power, in order to avoid electrical short-circuiting between cells.

By the apparatus of the invention significant advantages are obtainable. The introduction of fuel or oxygen-containing gas into the fluid electrode externally of the cell makes possible a pre-enrichment of the electrodes under more favorable conditions for diffusive fuel or oxygen adsorption and/or activation.

The turbulent flow of the catalytic particles reduces the interrface capacitance effect, thus overcoming the static diffusion barrier. The rate of flow of either electrode may be varied to adjust the cell to optimum or desired electrochemical activity.

Electrochemical products, non-susceptible to electrical energy production by further oxidation, may readily be removed during the replenishment step. Their disposition would depend upon their value as chemicals or as waste products.

Low-pressure cell operation is readily achieved by the apparatus of the invention, since electrode enrichment stage of the process is accomplished in a device or apparatus isolated pressurewise from the cell.

Construction of the fuel cell with zigzag passageways, as in FIGS. 4 and 6, provides a high-effective electrode area per unit cell volume.

Obviously, many modifications and variations of the invention as hereinbefore set forth may be made without departing from the spirt and scope thereof and therefore only such limitations shall be imposed as are indicated in the appended claims.

What is claimed is:

1. A fuel cell comprising a horizontally elongated housing of rectilinear cross section; a vertically zigzag semipermeable membrane extending lengthwise within said housing to partition the same into upper and lower chambers; separate electrode materials within said chambers in intimate contact with the upper and lower surfaces of said membrane and insulated from each other, at least one of said electrode materials comprising a circulating fluid; means within each of said chambers establishing an electro-conductive path between said electrode material and the exterior of said housing; ports at the opposite ends of said chambers for ingress and egress of fluid media comprising fuel cell reactants; and an external circulating system individual to said fluid electrode material and communicating with the ports of its respective chamber, said circulating system including means for blending reactants into said fluid electrode material and circulating the same, as well as means for removing unwanted reaction products therefrom.

2. Apparatus as in claim 1 in which both of said electrode materials comprise a fluid.

3. Apparatus as in claim 1 in which said membrane includes an electrolyte and one of said electrode materials is a solid porous mass in contact with said membrane, throughout it extent.

4. Apparatus as in claim 3 in which said chamber containing the fluid electrode forms the fuel side of said cell and said chamber containing said solid porous mass forms the oxygen side of said cell.

5. Apparatus as in claim 3 in which the inner wall surface of said housing opposite the side of said membrane which is contacted by said fluid electrode material is electro-conductive and is of complementary zigzag configuration inter-engaging said membrane to form a shallow zigzag chamber for transport of said fluid electrode material and reactant material admixed therewith through said housing.

6. Apparatus as in claim 4 including means for supplying oxygen-containing gas to one of the ports communicating with the chamber containing said porous mass and means for depressuring the gaseous reaction products discharging from the port communicating with the opposite end of said chamber.

References Cited

UNITED STATES PATENTS

| 1,182,759 | 5/1916 | Emanuel | 136—86 |
| 2,745,893 | 5/1956 | Chubb et al. | 136—100 |
| 2,925,454 | 2/1960 | Justi et al. | 136—86 |
| 2,980,749 | 4/1961 | Broers | 136—86 |
| 3,121,031 | 2/1964 | Gruneberg | 136—86 |

FOREIGN PATENTS

| 315,209 | 9/1928 | Great Britain. |

OTHER REFERENCES

Status Report on Fuel Cells, June, 1954, p. 20.

WINSTON A. DOUGLAS, Primary Examiner

H. A. FEELEY, Assistant Examiner

U.S. Cl. X.R.

136—120